April 27, 1937.  R. O. BAALMANN  2,078,306
DRILL SHARPENER
Filed Dec. 26, 1935  2 Sheets—Sheet 2
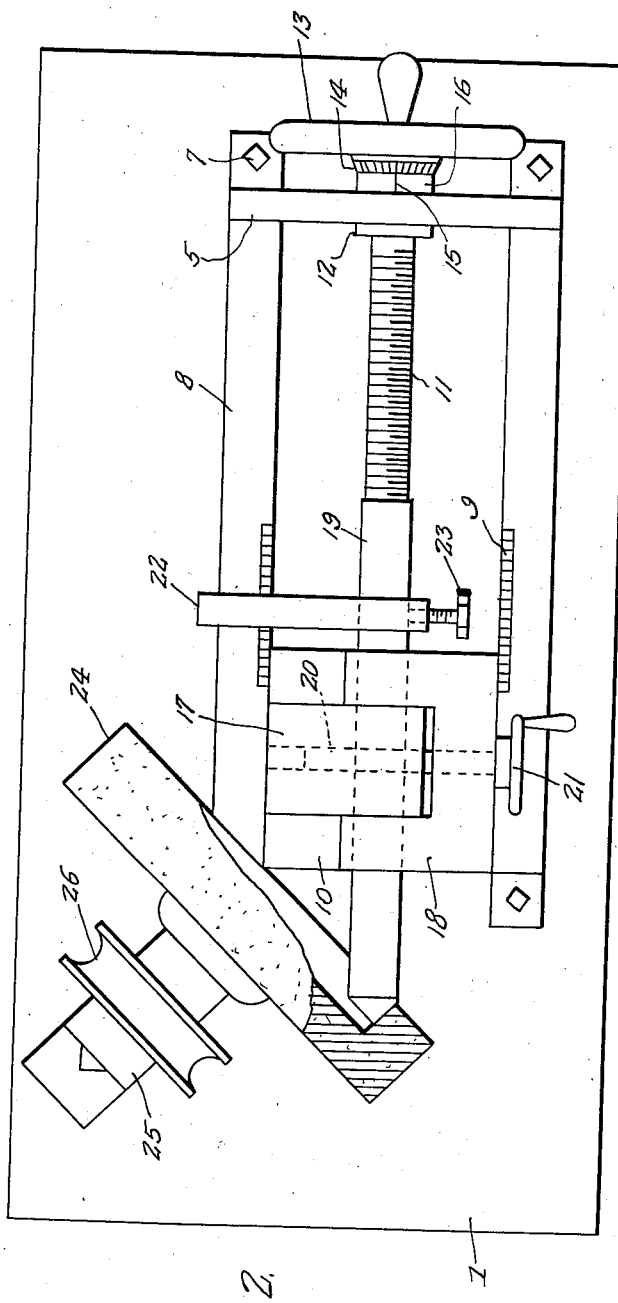
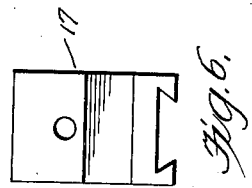
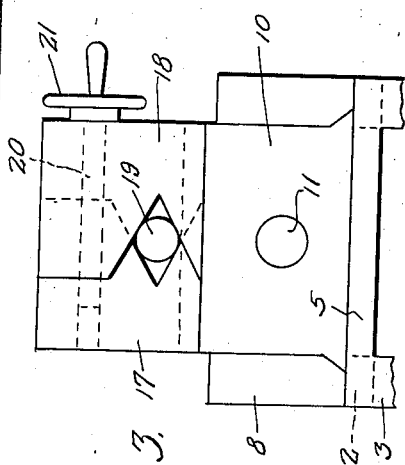
Inventor
R. O. Baalmann.
By Clarence A. O'Brien and Hyman Berman Attorneys Patented Apr. 27, 1937

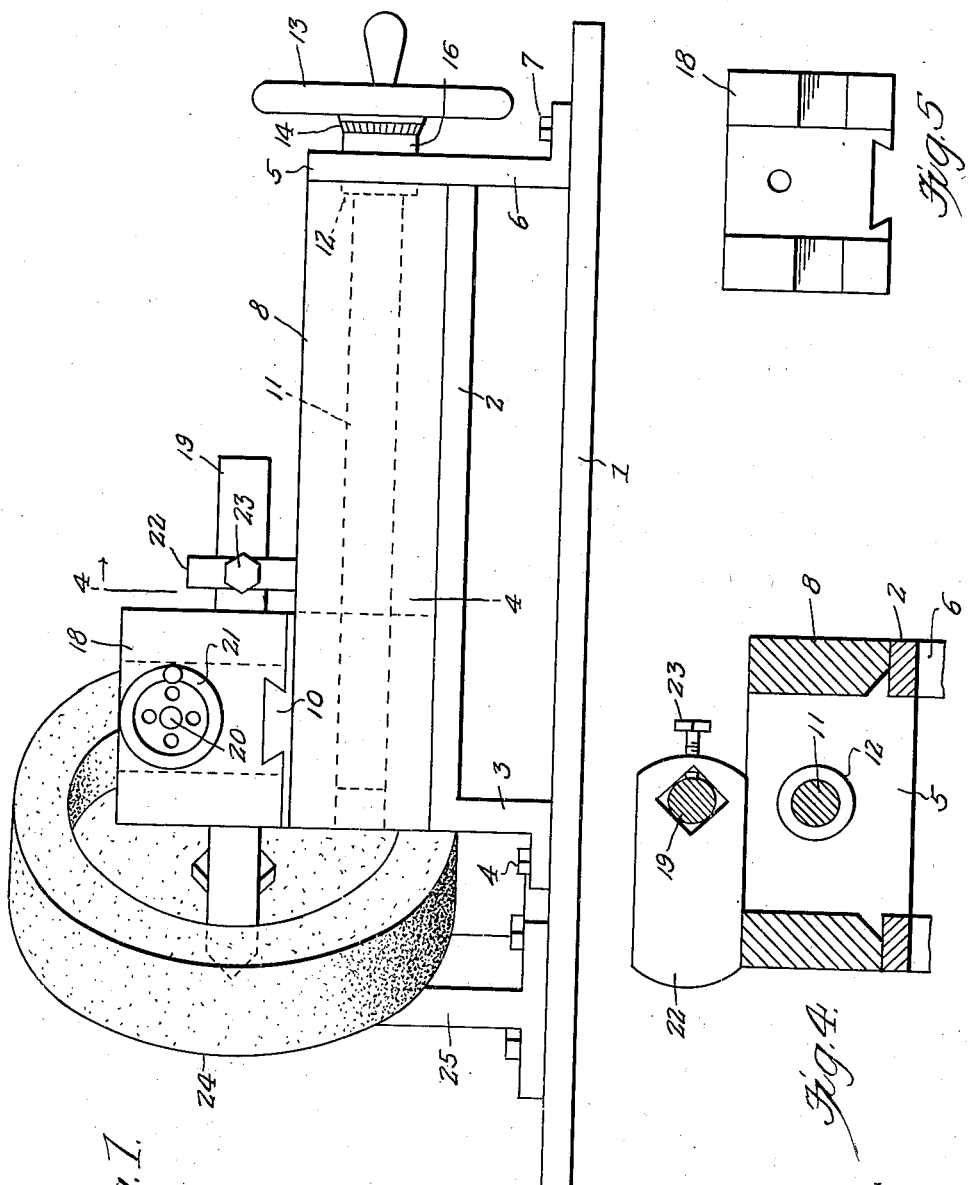

2,078,306

UNITED STATES PATENT OFFICE 2,078,306

DRILL SHARPENER

Roderick O. Baalmann, St. Louis, Mo.

Application December 26, 1935, Serial No. 56,288

2 Claims. (Cl. 51—219)

The present invention relates to new and useful improvements in drill sharpeners and has for its primary object to provide, in a manner as hereinafter set forth, a device embodying a novel construction and arrangement through the medium of which drills may be rapidly but uniformly sharpened on both sides.

Other objects of the invention are to provide a drill sharpener of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation of a drill sharpener constructed in accordance with the present invention.

Figure 2 is a top plan view thereof, a portion of the grinding wheel being broken away in section.

Figure 3 is a view in front elevation of the invention with the lower portion thereof omitted.

Figure 4 is a view in vertical transverse section, taken substantially on the line 4—4 of Figure 1.

Figures 5 and 6 are detail views in elevation of the drill clamping jaws, looking at the faces thereof.

Referring now to the drawings in detail, it will be seen that the embodiment of the invention which has been illustrated comprises a base 1 on which a pair of spaced, parallel, elevated rails 2 are fixed. At their forward ends, the rails 2 terminate in supporting legs 3 secured, as at 4, to the base 1. The rear ends of the rails 2 are fixed to a vertical back plate 5 which is provided with supporting legs 6 rigidly secured to the base 1, as at 7.

Rising from the rails 2 are guides 8 provided with graduations 9 (see Figure 2). Slidable on the rails 2 between the guides 8 is a block constituting a carriage 10 in which a feed screw 11 is threadedly engaged. The feed screw 11 is journaled in the back plate 5 and provided with a retaining collar 12. Fixed on the rear end portion of the feed screw 11 is a hand wheel 13 the inner end of the hub portion of which is graduated, as at 14, for coaction with a mark 15 on a stationary flange 16 on the back plate 5.

Mounted on the carriage 10 are coacting stationary and slidable jaws 17 and 18, respectively, which are adapted to secure therebetween the drill 19 to be sharpened. A screw 20 is provided for clamping the drill 19 in position between the jaws 17 and 18, said screw 20 being actuated through the medium of a hand wheel 21. The reference numeral 22 designates an arm which is adjustably and detachably secured on the drill 19 through the medium of a set screw 23. It may be well to here state that the arm 22 is adapted to ride on the upper edge or top of either of the guides 8.

The reference numeral 24 designates a grinding wheel which is mounted on the base 1 adjacent the forward ends of the rails 2. The shaft on which the grinding wheel 24 is fixed is journaled in a stand 25 which is secured on the base 1. Fixed on the shaft of the grinding wheel 24 is a grooved pulley 26 which may be driven from any suitable source of power.

Briefly, the manner of using the device is as follows:

The drill 19 is inserted between the jaws 17 and 18 and said jaws are then clamped thereon through the medium of the screw 20 and the hand wheel 21. The arm 22 is then slipped on the drill 19 from the rear end thereof and secured through the medium of the set screw 23. When secured in position, the arm 22 rests on top of one of the guides 8. The jaws 17 and 18 are then loosened to permit the drill 19 to be properly engaged with the grinding wheel 24, after which said jaws are again tightened. The grinding wheel 24 is now started and the hand wheel 23 is actuated as may be necessary to feed the drill to said grinding wheel. Then, when one side of the drill has been sharpened, the grinding wheel 24 is stopped and the graduations at 9 and 14 are noted. The drill is then backed off sufficiently to clear the grinding wheel, the jaws 17 and 18 are loosened to permit said drill to be rotated approximately one-half of a revolution, or reversed, bringing the indicator arm 22 to rest on top of the other guide 8, after which the jaws 17 and 18 are again tightened. The grinding wheel 24 is again started and the operation is repeated for grinding the other side of the drill 19. By observing the graduations 14 and 9 the grinding of the second side of the drill may be stopped when it has progressed to the point at which the grinding of the first side was stopped. By swinging the arm 22, which is fixed on the drill 19, from one of the guides 8 into engagement with the other of said guides 8 after the first side of said drill has been sharpened, said second side of the drill will be in precisely the same position relative to the grinding wheel 24 as was the first side of said drill. In other words, the arm 22 limits the rotation of the drill to exactly one-half of a revolution. It will thus be seen that both sides of the drill may be expeditiously and uniformly ground or sharpened.

It is believed that the many advantages of a drill sharpener constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:—

1. In a drill grinding and sharpening device of the class described, a frame including a base having a horizontally elongated channel-shaped guideway including spaced parallel upstanding adapter and guide plates of uniform height, a tool holding and adjusting vise including a body portion slidably mounted in the guideway between said plates, and having a pair of companion adjustably connected jaws disposed on a plane above the upper edges of said guideway, scale equipped vise adjusting means operatively connected with said guideway, a tool clamped between said jaws and disposed on a plane above the upper edges of said guide plates, the inner shank portion of the tool extending inwardly beyond the vise, and a handle forming and gauge lever detachably connected to said shank and extending at right angles thereto and adapted to rest alternately on the upper edges of said guide plates, said lever being swingable through an arc of approximately 180 degrees, whereby to permit the drill to be bodily turned in said jaws to accurately grind both faces of the penetrating end thereof in the manner described.

2. In a drill grinding and sharpening device of the class described, a frame having a base including a horizontally elongated channel-shaped guideway provided with spaced parallel side walls of uniform height, a tool holding and adjusting vise slidably mounted in the guideway and including tool holding means disposed on a plane above the upper edges of said side walls, a tool clamped in the tool holding means and disposed on a plane centrally above the side walls and guideway, the inner shank portion of the tool extending inwardly beyond said vise, and a lever attached to said inner shank portion and disposed at right angles to the longitudinal dimension thereof and adapted to rest alternately on the upper edges of said side walls, said lever being swingable through a half-circle with the direction of swing in opposite directions limited by the side walls to permit the drill to be bodily turned in the tool holding means to accurately grind both faces of the penetrating end thereof in the manner described.

RODERICK O. BAALMANN.